United States Patent
Sanders et al.

(10) Patent No.: US 7,327,460 B2
(45) Date of Patent: Feb. 5, 2008

(54) TRANSMISSION MODE RFOG AND METHOD FOR DETECTING ROTATION WITH RFOG

(75) Inventors: Glen A. Sanders, Scottsdale, AZ (US); Lee K. Strandjord, Tonka Bay, MN (US)

(73) Assignee: Honeywell International, Inc., Morristown, NJ (US)

( * ) Notice: Subject to any disclaimer, the term of this patent is extended or adjusted under 35 U.S.C. 154(b) by 97 days.

(21) Appl. No.: 11/266,628

(22) Filed: Nov. 2, 2005

(65) Prior Publication Data
US 2007/0097375 A1  May 3, 2007

(51) Int. Cl.
*G01C 19/72* (2006.01)
(52) U.S. Cl. ............................................... 356/461
(58) Field of Classification Search ............. 356/460, 356/461, 462, 464, 465
See application file for complete search history.

(56) References Cited

U.S. PATENT DOCUMENTS

| | | | | |
|---|---|---|---|---|
| 4,107,628 A * | 8/1978 | Hill et al. | .................... | 356/461 |
| 4,135,822 A | 1/1979 | Ezekiel | | |
| 4,323,310 A * | 4/1982 | Shaw et al. | .................. | 356/461 |
| 4,396,290 A * | 8/1983 | Morris | ......................... | 356/461 |
| 4,429,573 A * | 2/1984 | Walker | ........................ | 356/461 |
| 7,106,448 B1 * | 9/2006 | Vawter et al. | ............... | 356/461 |
| 2004/0223160 A1 * | 11/2004 | Chen et al. | .................. | 356/460 |
| 2004/0263856 A1 | 12/2004 | Willig et al. | | |
| 2005/0111509 A1 | 5/2005 | Brassuer et al. | | |
| 2005/0117157 A1 | 6/2005 | Tarsa | | |

FOREIGN PATENT DOCUMENTS

EP    1391693 A1    2/2004

OTHER PUBLICATIONS

European Search Report, Application No. EP 06123317 dated Feb. 20, 2007.

* cited by examiner

*Primary Examiner*—Samuel A. Turner
(74) *Attorney, Agent, or Firm*—Ingrassia Fisher & Lorenz

(57) ABSTRACT

Methods and apparatus are provided for sensing a rotation rate of a ring resonator in a transmission mode. A ring resonator for circulating light beams in counter-propagating directions comprises an optical fiber coil having a hollow core and first and second ends. A first optical element is configured to receive an input light beam and direct a portion of the input light beam in a counter-propagating direction of the ring resonator. A second optical element is configured to direct with the first optical element a majority of a circulating light beam in the counter-propagating direction of the ring resonator and derive a transmission mode component of the circulating light beam at one of the ends. The portion of the input light beam enters one of the first and second ends. The circulating light beam is based on the input light beam. The transmission mode component indicates a resonance peak of the counter-propagating direction of the ring resonator.

20 Claims, 2 Drawing Sheets

TRANSMISSION MODE RFOG AND METHOD FOR DETECTING ROTATION WITH RFOG

FIELD OF THE INVENTION

The present invention generally relates to gyro systems, and more particularly relates to rotational sensor techniques for use in a fiber optic gyro

BACKGROUND OF THE INVENTION

Gyros have been used to measure rotation rates or changes in angular velocity about an axis. A basic conventional fiber optic gyro (FOG) includes a light source, a beam generating device, and a coil of optical fiber coupled to the beam generating device that encircles an area. The beam generating device transmits light beams into the coil that propagate in a clockwise (CW) direction and a counter-clockwise (CCW) direction along the core of the optical fiber. Many FOGs utilize glass-based optical fibers that conduct light along a solid glass core of the fiber. The two counter-propagating (e.g., CW and CCW) beams experience different pathlengths while propagating around a rotating path, and the difference in the two pathlengths is proportional to the rotational rate.

In a resonator fiber optic gyro (RFOG), the counter-propagating light beams are desirably monochromatic (e.g., in a single frequency) and circulate through multiple turns of the fiber optic coil and for multiple passes through the coil using a recirculating device such as a fiber coupler. The beam generating device modulates and/or shifts the frequencies of each of the counter-propagating light beams so that the resonance frequencies of the resonant coil may be observed. The resonance frequencies for each of the CW and CCW paths through the coil are based on constructive interference of successively circulated beams in each optical path. A rotation of the coil produces a shift between in the respective resonance frequencies of the resonant coil and the frequency difference, such as may be measured by tuning the CW beam and CCW beam frequencies to match the resonance frequency shift of the coil due to rotation, indicates the rotation rate.

The RFOG may encounter a variety of anomalies that decrease the accuracy of the rotational rate measurement. In a reflecting mode, the ring resonator reflects light having a state matched with a pre-determined state of the resonator, and the resonance frequencies for each of the CW and CCW paths through the fiber optic coil are detected by monitoring the light that does not enter the resonator. The resonance is thus observed as a "resonance dip" because less light is observed when the resonator is near resonance than when the resonator is not near resonance. As previously mentioned, successive recirculation of each of the counter-propagating light beams produces constructive interference at the resonance frequencies, and the center of a resonance dip in the resonance lineshape indicates a resonance frequency. It is desirable to have a definitive symmetrical resonance dip to more accurately indicate the resonance frequency. To this end, the resonator may be designed to circulate light in a pre-determined state (e.g., TEM00-S representing a state of the light having a lowest order spatial mode and a vertical polarization in a free space resonator).

Generally, a majority of the light having the matched state, or the desired input light component, is reflected by the resonator to circulate in the fiber optic coil. Non-resonant, stray undesired light (e.g., light that is not properly matched in the polarization mode or the spatial mode of the resonator) may interfere with the light in the matched state that is reflected by the resonator and circulated in the resonator and, thus, produce errors in the detection of the resonance centers. The resonance dip may be affected by several factors including, but not necessarily limited to, a residual launch light component in the input light beam to the resonator having either 1) an undesired polarization state or 2) light, from the input light beam to the resonator, with a spatial distribution that overlaps with higher order spatial modes of the light in the resonator. Both of these are due to an imperfect input light condition or launch condition at the input to the resonator. Although the residual launch light component may not resonate in the resonator when the desired light component is near resonance, this residual light may adversely affect the observed shape of the resonance dip resulting from the desired light component.

In addition to the interference from non-resonant residual light components in the launch condition, higher order spatial modes of light in the resonator may resonate or be near resonance and may alter the shape of the resonance dip for the mode used for rotation sensing. For example, resonance of the higher order spatial modes of light may produce additional dips close to the resonance lineshape of the desired mode used for rotation sensing. Additionally, the second polarization state may also resonate or be near resonance and may alter the shape of the resonance dip for the other polarization mode used for rotation sensing. When these additional dips are positioned in proximity to the resonance dips associated with the resonance frequency or superimposed onto the resonance dips associated with the resonance frequency, the shape of the resonance dip associated with the resonance frequency may be altered. As previously mentioned, without exciting a resonance, input light that is not properly matched in the polarization mode or the spatial mode of the resonator may distort the shape of the resonance dip of the mode used for rotation sensing.

Interference from non-mode matched residual light in the launch condition having either the undesired polarization state or higher order spatial mode components of the resonator may complicate identification of the resonance centers and provide inaccurate determinations of resonance frequencies and rotations rates. Determination of the resonance centers for each of the resonance frequencies of the CW and CCW beams directly affects the rotational rate measurement and, thereby severely limits the accuracy of the RFOG.

Several mechanisms may couple light into the undesired polarization state of the fiber optic resonator. In general, light traveling in the undesired polarization state results from a combination of these mechanisms. As previously mentioned, light may be cross-coupled inside the recirculating device, such as a fiber coupler. Light may also excite the second polarization state, or couple into the second polarization state, of the resonator when undesirably injected into the optical fiber with a component of the light in the undesired polarization state. This may be exacerbated by possible variances in the states of polarization of the fiber inside the resonator due to temperature or stress variation, thereby making repeated light launches into one polarization state of the resonator more difficult. Even if the light beams are originally introduced to the coil of the RFOG in the first polarization mode, the optical fiber may have one or more imperfections that couple light into the second polarization mode.

One way of limiting such cross-talk between polarization modes of the fiber resonator is to employ polarization preserving fiber. Polarization preserving fiber incorporates stresses defining different speeds of light (i.e., birefringence) that attenuate the cross-coupling of light from one polarization axis of the fiber to the other. This feature of polarization preserving fiber stabilizes the polarization mode of the ring resonator, thereby assisting the task of stably launching a fraction of light into a desired mode. Using conventional optical fibers, particularly polarization preserving fibers, the difference in the speed of light between light traveling on the two principle axes of polarization in the fiber typically varies with temperature. This variation can cause the relative resonance frequencies of the two polarization states to vary with temperature. In some instances, the resonance frequency of the undesired polarization state may coincide with the resonance frequency of the desired polarization state under some environmental conditions.

Polarization-induced errors may severely limit the accuracy of the RFOG because the accuracy of the determination of the resonance centers, and thus the resonance frequencies in the CW and CCW directions, directly affects the rotational rate measurement. Additionally, these errors in the measurement may change radically with respect to the temperature in conventional optical fibers due to the sensitivity of the associated birefringence to temperature. Consequently, the gyro output may drift without influence from a variation in rotation rate. Additional error mechanisms in an RFOG employing conventional glass fibers that are attributable to the propagation of light in the solid glass medium of the optical fiber include optical Kerr Effect, Stimulated Brillouin Scattering, and Raleigh back-scattering.

Accordingly, it is desirable to provide a fiber optic gyro having a more accurate rotational rate measurement by minimizing the interference from input light matched to the undesired polarization state of the resonator or input light matched to the undesired spatial modes of the resonator. More particularly, it is desirable to provide a fiber optic gyro having a transmission mode for detecting resonance centers of the resonator. In addition, it is desirable to provide a method for measuring a rotational rate measurement in a fiber optic gyro that minimizes interference from input light that is incorrectly or unintentionally matched to the undesired polarization state or undesired spatial modes of the resonator. Furthermore, other desirable features and characteristics of the present invention will become apparent from the subsequent detailed description of the invention and the appended claims, taken in conjunction with the accompanying drawings and this background of the invention.

BRIEF SUMMARY OF THE INVENTION

Methods and apparatus are provided for sensing a rotational rate of a ring resonator in a transmission mode. In an exemplary embodiment, a ring resonator for circulating light beams in counter-propagating directions comprises an optical fiber coil having a hollow core and first and second ends, a first optical element configured to receive an input light beam and direct a portion of the input light beam in a counter-propagating direction of the ring resonator, and a second optical element configured to direct with the first optical element a majority of a circulating light beam in the counter-propagating direction of the ring resonator and derive a transmission mode component of the circulating light beam at one of the ends. The portion of the input light beam enters one of the first and second ends, and the circulating light beam is based on the input light beam. The transmission mode component indicates a first resonance peak of the counter-propagating direction of the ring resonator.

In another exemplary embodiment, a resonator fiber optic gyro (RFOG) assembly is provided comprising a beam generator configured to produce first and second light beams, a ring resonator having an input configured to receive the first and second light beams and having an output, and a photodetector. The ring resonator comprises a hollow core optical fiber configured to circulate first and second circulating light beams in different counter-propagating directions. The ring resonator is configured to derive a first component of the first circulating light beam at the output and produce a second component of a second circulating light beam at the output. The first circulating light beam is based on the first light beam, and the second circulating light beam is based on the second light beam. The first component indicates a resonance of a first counter-propagating direction of the ring resonator, and the second component indicates a resonance of a second counter-propagating direction of the ring resonator. The photodetector is configured to detect a first resonance center of the first counter-propagating direction based on the first component, and detect a second resonance center of the second counter-propagating direction based on the second component.

In another exemplary embodiment, a method for sensing a rotation rate of a ring resonator having a hollow core optical fiber is provided comprising the steps of transmitting each of first and second light beams into the hollow core optical fiber in a different counter-propagating direction of the ring resonator, circulating the first and second counter-propagating light beams through the hollow core optical fiber while detecting a transmissive component sampled from each of the first and second light beams, determining a first resonance frequency of a first counter-propagating direction of the ring resonator from a resonance peak of the first counter-propagating direction, determining a second resonance frequency of a second counter-propagating direction of the ring resonator from a resonance peak of the second counter-propagating direction, and measuring a frequency shift between the first resonance frequency and the second resonance frequency. Each of the transmissive components indicates a corresponding resonance peak based on a lowest order spatial mode and a single polarization mode. The frequency shift indicates the rotation rate.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
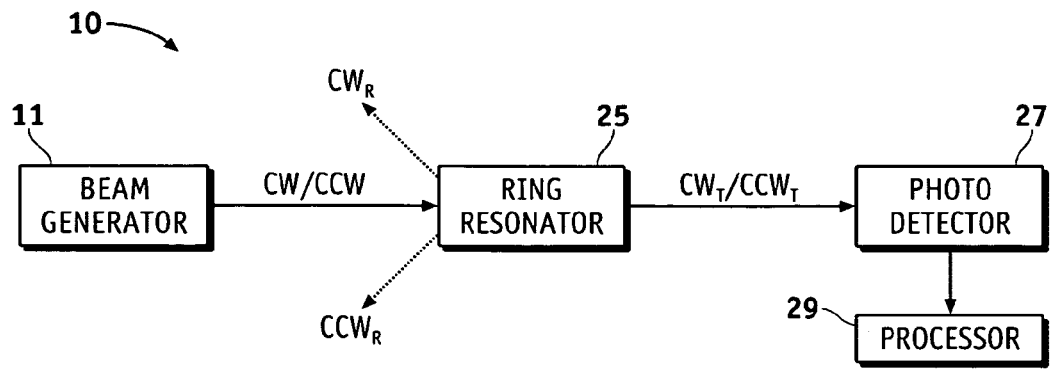
FIG. 1 is a block diagram of a resonator fiber optic gyro in accordance with an exemplary embodiment of the present invention.

Referring now to the drawings, FIG. 1 is a block diagram of a resonator fiber optic gyro (RFOG) 10 in accordance with an exemplary embodiment of the present invention. The RFOG 10 comprises a beam generator 11 configured to generate input light beams (e.g., a clockwise (CW) input light beam and a counter-clockwise (CCW) input light beam), a ring resonator 25 having an input for receiving the input light beams and having an output, a photodetector 27, and a processor 29 coupled to the photodetector 27. The ring resonator 25 receives the CW and CCW input light beams at the input, circulates a portion of these input light beams, and produces reflected light components ($CW_R$ and $CCW_R$) which are derived from a combination of components from the input light beams and the circulating beams at the input of the ring resonator 25. For convenience of explanation, the term input light beam refers to the light provided to the ring resonator 25. Additionally, the term circulating light beam refers to the light traveling in an optical fiber coil of the ring resonator 25 that has traveled through the optical fiber coil at least once. Transmission mode components ($CW_T$ and $CCW_T$) are based on a sample of the input light beams that are tuned to the CW and CCW resonances of the ring resonator 25 and substantially solely derived by sampling the circulating beams at the output of the ring resonator 25. The ring resonator 25 is configured to partially transmit a component of the circulating beams (i.e., transmission mode components), at the output of the ring resonator 25, from the light circulating in the ring resonator 25. The light that is transmitted, or transmission mode components, are thus originally derived from input light that has properly matched a predetermined mode of the ring resonator 25.

In an exemplary embodiment, the ring resonator configuration allows for sampling of the light circulating inside the ring resonator 25 to provide transmission mode components ($CW_T$ and $CCW_T$) from the light circulating in the ring resonator 25 that match a single polarization mode of the resonator (e.g., selected from S-polarization and P-polarization) and the preferred spatial mode (e.g., usually the lowest order mode) of the ring resonator 25. A component of the circulating light beams also remains in the ring resonator 25 and a portion of these are contained within the reflected beam components ($CW_R$ and $CCW_R$) at the input of the ring resonator 25. The reflected beam components ($CW_R$ and $CCW_R$) are superpositions of a portion of light that decays from the circulating light in the resonator 25 and the light that is not properly mode-matched into the input of the resonator 25. The photodetector 27 detects a resonance peak from the transmission mode component of each of the counter-propagating directions (e.g., CW and CCW) of light circulating in the ring resonator 25, and the center of the resonance peak corresponds to a resonance frequency of a particular counter-propagating direction. The processor 29 determines a frequency shift between the resonance frequency of the CW direction and the resonance frequency of the CCW direction, and this frequency shift indicates the rotational rate of the RFOG 10. In an exemplary embodiment, the processor 29 may be coupled to the beam generator 11 to effect closed loop tracking of the light frequencies to the resonance frequencies of the resonator 25.

Figure 2:
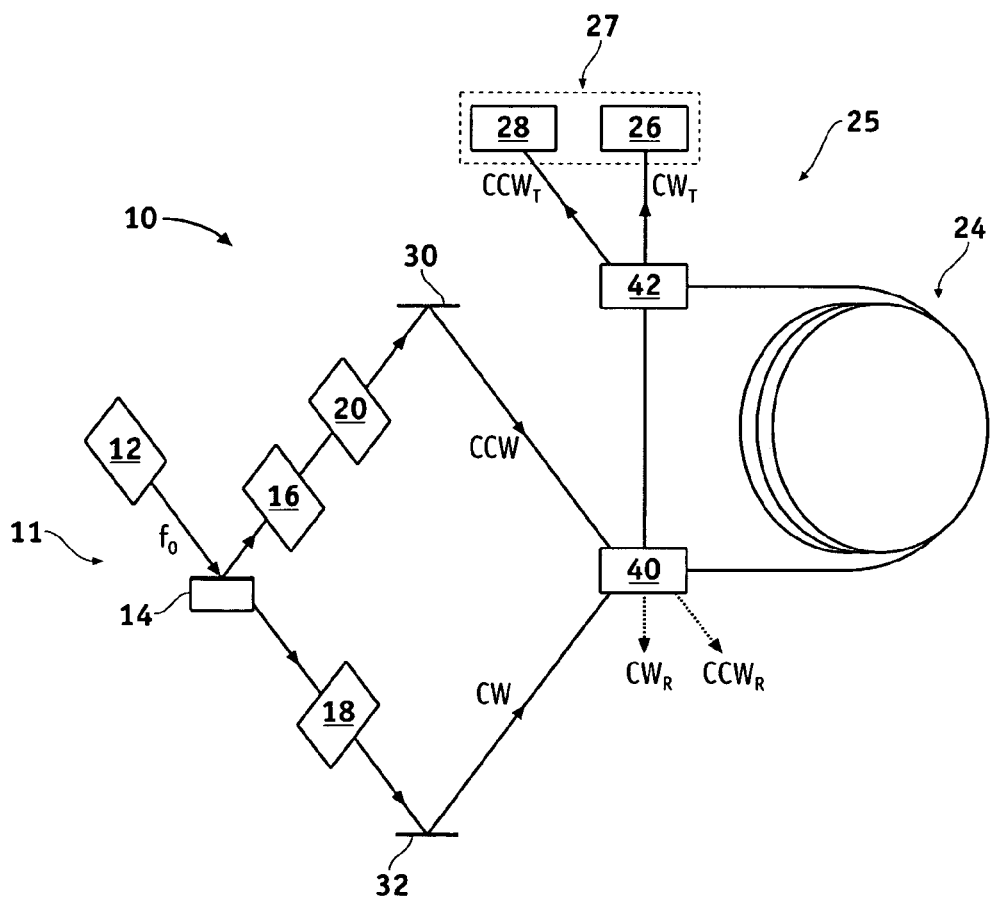
FIG. 2 is a schematic diagram of the resonator fiber optic gyro shown in FIG. 1 in accordance with an exemplary embodiment of the present invention.

FIG. 2 is a schematic diagram of the RFOG 10 shown in FIG. 1 in accordance with an exemplary embodiment of the present invention. The beam generator 11 comprises a tunable light source 12 (e.g., a laser) configured to generate a light beam having a frequency $f_0$, a beam splitter 14 configured to receive the light beam from the light source 12 and further configured divide the light beam from the light source 12 into first and second light beams, a first wave modulator 16 configured to receive the first light beam from the beam splitter 14 and further configured to modulate the first modulated light beam, a second wave modulator 18 configured to receive the second light beam from the beam splitter 14 and further configured to modulate the second light beam, and a frequency shifter 20 configured to receive the first modulated light beam from the first wave modulator 16 and further configured to shift the frequency of the first modulated light beam.

Although the RFOG 10 is shown and described with the tunable light source 12, the RFOG 10 may alternatively include first and second tunable lasers that each synthesize the CW and CCW light beams, respectively, and introduce the light beams into the resonator 25 thereby replacing the beam splitter 14. In this alternative embodiment, the light beam produced by the first laser is tuned to a frequency $f_0$, and the light beam produced by the second laser is tuned to a frequency $f_0 + \Delta f$ thereby replacing the frequency shifter 20. The relative frequency drift and jitter between the two laser frequencies is preferably substantially minimized to a level that minimizes or does not affect the accuracy and stability of the frequency shift, and thus rotational rate, measurement. Each of these lasers is sinusoidally frequency modulated at the respective frequencies thereby replacing the frequency modulators 16 and 18. Additionally, the RFOG 10 may include additional mirrors and beam splitters for directing the propagation of light beams from the light source 12 to the optical fiber coil 24 and for directing light from the recirculator 40, 42 to the photodetector 27.

After modulating the light beams, the beam generator 11 directs the modulated light beams to the ring resonator 25. The ring resonator 25 comprises a recirculator 40, 42 and a hollow core optical fiber coil 24 having first and second ends coupled to the recirculator 40, 42. The recirculator 40, 42 introduces the modulated light beams (e.g., CW and CCW input light beams) into the hollow core of the optical fiber coil 24 and recirculates the modulated light beams through the optical fiber coil 24. In an exemplary embodiment, the recirculator 40, 42 comprises a first optical unit 40 and a second optical unit 42. The first optical unit is configured to receive the modulated light beams (e.g., CW and CCW input light beams) from the beam generator 11, introduce a portion of the CCW input light beam into a first end of the optical fiber coil 24, and direct a portion of the CW input light beam to the second optical unit 42. The second optical unit 42 is configured to introduce the portion of the CW input light beam from the first optical unit 40 into a second end of the optical fiber coil 24 and to derive (with low loss) transmission mode components ($CW_T$ and $CCW_T$) from the CW and CCW light beams traveling in the optical fiber coil 24. The first optical unit 40 is further configured to provide the reflected mode components ($CW_R$ and $CCW_R$) of the CW and CCW input light beams. The recirculator 40, 42 reintroduces light emerging from one end of the optical fiber coil 24 into the other end of the fiber coil 24, thus causing light to propagate through the fiber coil 24 many times.

The second optical unit 42 may be selected to have a transmission mode that favors one polarization mode (e.g., selected from one of S-polarization and P-polarization) of the light circulating in the ring resonator 25. The transmission mode components are derived from light circulating with the ring resonator 25, and thus inherently consist of the desired polarization state and spatial mode that is made to propagate and resonate within the resonator 25. The transmission mode components are derived from the light circulating in the ring resonator 25 via the second optical unit 42, and the second optical unit 42 directs these transmission mode components ($CW_T$ and $CCW_T$) to the photodetector 27. In an exemplary embodiment, the photodetector 27 comprises a first photodetector 26 for detecting the resonance center of the resonator 25 in the CW direction via a first transmission mode component (e.g., $CW_T$) and a second photodetector 28 for detecting the resonance center of the resonator 25 in the CCW direction via a second transmission mode component (e.g., $CCW_T$).

In an exemplary embodiment, the light source 12 is a single frequency tunable laser having frequency stability, substantially narrow line width, and relatively high power capability. The wave modulators 16, 18 frequency-modulate the first and second light beams such as by introducing a sinusoidal waveform into the light beams, and the particular modulation may be selected to improve sensitivity of the RFOG 10 to a detected frequency shift ($\Delta f$), described in greater detail herein below. The first modulated light beam and second modulated light beam are introduced into the optical fiber coil 24 in CCW and CW direction, respectively, such as via opposite ends of the optical fiber coil 24.

The CW beam has an unshifted laser frequency ($f_0$) and is introduced into the resonator 25. For rotation sensing, the frequency $f_0$ of the CW beam is tuned (e.g., by tuning the frequency of the laser 12) to the resonance frequency of the resonator 25 in the CW direction. The frequency shifter 20 is configured to tune the frequency $\Delta f$ to align the CCW beam frequency with a resonance center relative to the resonance frequency of the resonator in CCW direction. During rotation sensing, the frequency shifter 20 frequency shifts the light frequency from that of the laser 12 by an amount $\Delta f$ and injects the frequency shifted light into the optical fiber coil 24 in the CCW direction. Two methods of accomplishing a frequency shift include the use of an acousto-optic frequency shifter and the use of a phase modulator with a serrodyne modulation waveform. In the latter method, the serrodyne waveform is a form of a sawtooth waveform. To apply a relatively pure frequency shift, the phase shift amplitude of the sawtooth waveform, described in greater detail hereinafter, is set to an integer multiple of $2\pi$ and the sawtooth waveform has a substantially fast flyback time when compared to its period.

To measure the resonance center-frequencies of the optical fiber coil 24, in either the CW direction or CCW direction, a standard synchronous detection technique is used. Each input light beam (e.g., CW beam and CCW beam) is sinusoidally phase-modulated, and therefore frequency modulated at frequencies $f_m$ and $f_n$, respectively, to dither each input beam frequency across a resonance lineshape as measured by the photodetectors 26, 28. For example, additional circuitry coupled to the photodetectors 26, 28 may demodulate the outputs of the photodetectors 26, 28 at frequencies $f_m$ and $f_n$, respectively, to measure resonance centers indicated by the light outputs of the CW and CCW beams. At a line center of the resonance lineshape, or the resonance center, the photodetectors 26, 28 detect a minimum output at the fundamental detection of frequencies $f_m$ and $f_n$, respectively. When the input beam frequency (e.g., $f_0$ or $f_0+\Delta f$) is off-resonance, an error signal at frequencies $f_m$ and $f_n$, respectively, is sensed by the photodetectors 26, 28 and used to tune the respective beam frequency to the respective resonance frequency of the optical ring resonator 25. The frequency of the CW beam is tuned by changing the frequency of the laser, $f_0$, and the frequency of the CCW beam is adjusted via a feedback loop that changes the frequency shift of the frequency shifter, $\Delta f$, so that $f_0+\Delta f$ matches the CCW resonance frequency of the optical ring resonator 25.

When $f_0$ is tuned away from the resonance frequency of the resonator 25 in the CW direction, the energy from the CW beam does not enter the optical fiber and the light is reflected at the first optical unit 40. When $f_0$ is tuned to the resonance frequency of the resonator 25 in the CW direction, the CW beam enters the optical fiber coil 24 having a spatially- and polarization-matched mode with the resonator 25, which in turn causes the $CW_T$ beam striking the CW photodetector 26 to have a maximum output, i.e., a resonance peak, thereby indicating the resonance center. Similarly for the CCW light beam, the energy of the CCW beam enters the optical fiber coil 24 when the CCW beam is tuned to the resonance frequency of the resonator 25 in the CCW direction, having a spatially- and polarization-matched mode with the resonator 25, which in turn causes the $CCW_T$ beam striking the CW photodetector 28 to have a maximum output.

In the absence of rotation, the round-trip path-lengths of the CW and CCW beams inside the resonator 25 in the CW and CCW direction, respectively, are substantially equal. Thus, $\Delta f$ is tuned to zero by the frequency shifter 20. In the presence of rotation, the round-trip path-lengths differ between the CW and the CCW directions producing a resonance frequency difference between the two directions that is proportional to the rotation rate. By tuning the frequency $f_0$ to track the CW resonance and the frequency $\Delta f$ to track the CCW resonance center, the rotation rate is determined.

In a preferred exemplary embodiment of RFOG 10, frequency shifting is obtained using a serrodyne method whereby a phase ramp is applied to an input light beam (e.g., CW and CCW beams). By driving a phase modulator, such as the wave modulators 16, 18, with a continuous and linear phase ramp, a frequency shift may be obtained, that is proportional to the slope of the phase ramp. A sawtooth waveform of having a $2\pi$ phase height and a frequency $\Delta f$ produces substantially equivalent results as the continuous ramp, and the sawtooth frequency ($\Delta f$) is adjusted to track the CCW resonance in the presence of rotation. As previously mentioned, the frequency shifter 20 may apply a relatively pure frequency shift when the sawtooth waveform flyback time is substantially fast compared to the waveform period. The polarity of the phase ramp is reversed for an opposite direction of rotation.

A hollow core, band-gap, optical fiber having an extremely low bend loss is preferably used with the resonator 25, and the coil 24 preferably has a large number of turns about a substantially small area to achieve a compact gyro which is one advantage of this invention. For example, the coil 24 may have from about 20-40 turns of the optical fiber about a one centimeter diameter. In one exemplary embodiment, the length of the coil 24 is selected to separate the resonance peaks associated with the higher order spatial modes of the light circulating in the resonator 25 from the resonance peaks of the lowest order spatial mode. Additionally, the length of the coil 24 is selected to separate the resonance peak associated with the undesired polarization mode from the resonance peak of the desired polarization mode. The distance of separation (in frequency) of the undesired resonance peaks (e.g., resulting from the undesired spatial modes and/or the undesired polarization mode of light circulating in the resonator 25) from the desired resonance peaks (e.g., resulting from the matched transmission mode components of the light circulating in the resonator 25) is based on minimizing any distortion or interference that such undesired resonance peaks may have on the desired resonance peaks.

In general, the hollow core optical fiber is typically glass-based with a plastic outer jacket, a hollow inner core, and a microstructure glass cladding. In the hollow core optical fiber, light injected from the recirculator 40, 42 traverses mostly through free space (e.g., air or a vacuum) along the core, and only about a few percent or less of the optical energy of light is contained in the glass walls of the fiber surrounding the hollow core. The recirculator 40, 42 may comprise free-space optics, such as the mirrors with dielectric coatings. In this case, because a large majority of the light energy traverses through free space along the hollow core of optical fiber, the transition between the recirculator 40, 42 and the hollow core optical fiber has a near-perfect index matching, and high reflectivity laser mirrors with low loss and attractive polarization properties may be used for the recirculator 40, 42. The hollow core fiber is suited to significantly attenuate, or eliminate altogether, the rotation measurement errors commonly associated with the properties of the glass medium in the core of conventional fibers.

The recirculator 40, 42 may additionally comprise at least one polarization unit that attenuates light emerging from the optical fiber coil 24 having an undesired polarization state while minimizing losses of a desired polarization state in the light circulating within the resonator 25. The polarization unit reflects light in the desired polarization state (e.g., S-polarization) back into the optical fiber coil 24 to a substantially high degree (e.g., about 95% or more) and passes light in the undesired polarization state (e.g., P-polarization) out of the optical fiber coil 24 (e.g., removes light in the undesired polarization state from the light recirculating in the optical fiber coil 24) to a substantially high degree. The recirculator 40, 42 may comprise a single polarization unit to receive/reflect light exiting from the ends of the optical fiber coil 24 or may comprise a network of two or more polarization units to separately receive/reflect light exiting from each end of the optical fiber coil 24.

In an exemplary embodiment, the polarization unit has a Brewster angle of incidence (e.g., about 56°), for light impinging on the main surface (e.g., the surface receiving light exiting from the optical fiber coil 24) of the polarization unit, at which S-polarized light is reflected at a substantially high degree and P-polarized light is passed out of the ring resonator 25 at a substantially high degree. In this exemplary embodiment, the polarization unit preferably receives light from the ends of the optical fiber coil 24 at this Brewster angle of incidence. One example of the polarizing unit is a thin film polarizer that comprises a glass substrate having a coating (e.g., a stack of dielectric coatings), although a variety of other reflective devices having polarization sensitivity may be used. In conjunction with the hollow core optical fiber, light recirculating in the optical fiber coil 24 having the desired polarization may have a significantly low loss when propagating from the hollow core fiber into free space and then reflected by the polarization unit. Additionally, by using hollow core fiber that substantially maintains the state of polarization of light, or high birefringence hollow core optical fiber, the polarization state of the light inside the optical fiber may be oriented and maintained relative to the polarization state of the light reflected by polarization unit. Thus, losses associated with the desired polarization state are minimized, and the error in the rotation rate measurement due to the resonance magnitude of the undesired polarization state may be minimized. Further, the use of hollow core fiber significantly reduces the temperature dependence of the birefringence which allows for a stable resonance frequency separation between the desired polarization state and the residual undesired polarization state. Consequently, the use of hollow core fiber reduces errors in rotation rate over a wider variety of environmental conditions. Light guiding hollow core fiber may be realized via an optical bandgap effect in photonic crystal fiber structures and is frequently referred to as bandgap fiber.

Figure 3:
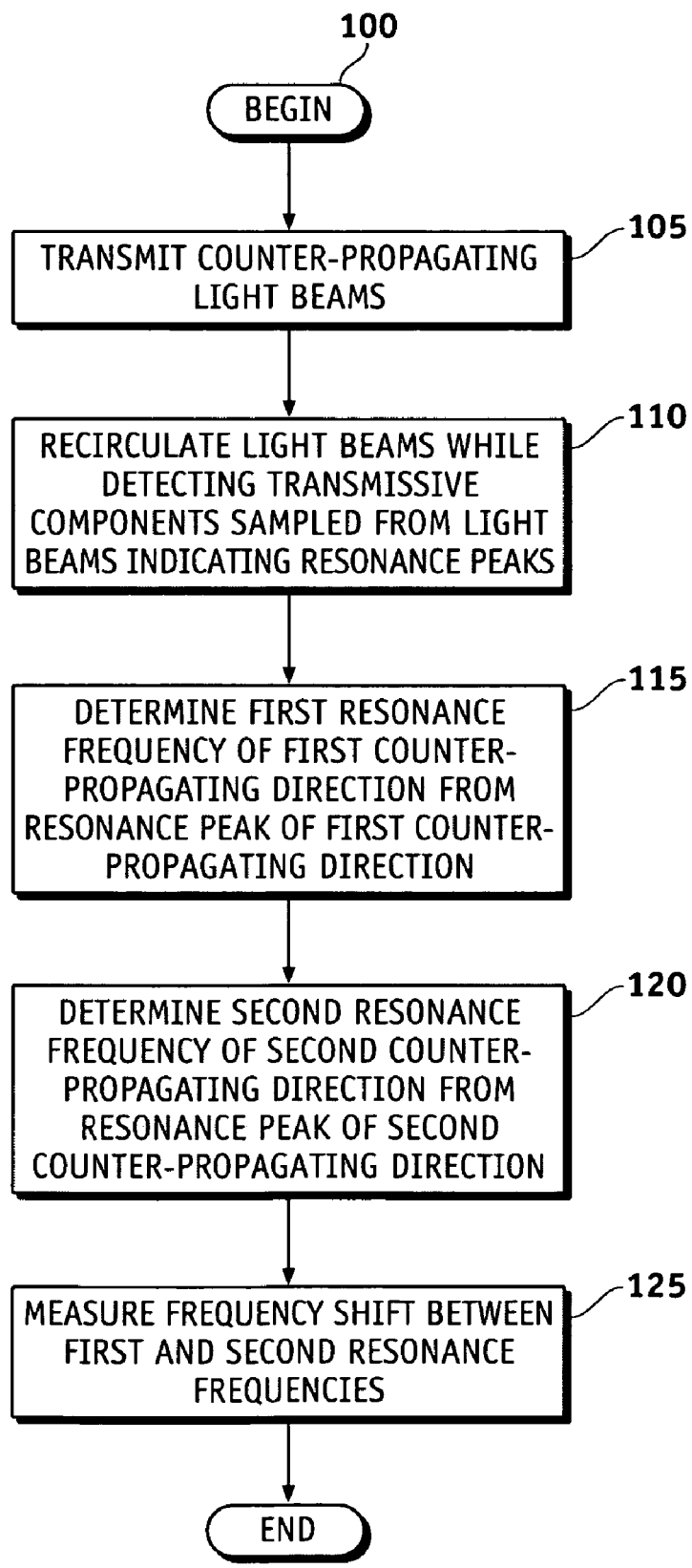
FIG. 3 is a flow diagram of a method for sensing a rotation rate of a ring resonator in accordance with an exemplary embodiment of the present invention.

FIG. 3 is a flow diagram of a method for sensing a rotation rate of a ring resonator in accordance with an exemplary embodiment of the present invention. The method begins at step 100. Referring to FIGS. 1 and 3, first and second counter-propagating light beams are transmitted into the hollow core optical fiber coil 24 at step 105. The recirculator 22 recirculates the first and second counter-propagating light beams through the hollow core optical fiber coil 24 while providing sampled light from the recirculating light (i.e., transmission components) having the desired polarization and spatial modes out of each of the first and second counter-propagating light beams in the resonator 25 at step 110. By detecting the maximum output of the transmitted component of the first counter-propagating light beam, a first resonance peak center is determined, and a first resonance frequency is determined at step 115. By detecting the maximum output of a transmitted component of the second counter-propagating light beam, a second resonance peak center is determined, and a second resonance frequency is determined at step 120. The frequency shift between the frequency of the first counter-propagating light beam and the frequency of the second counter-propagating light beam (the light frequencies being matched to the resonance frequencies in the counter-propagating directions of the resonator) are determined at step 125, and this frequency shift indicates the rotation rate of the ring resonator.

Advantages of the RFOG 10 include, but are not limited to: a capability of providing about a 0.01 deg/hr bias and about a 0.001 deg/root-hr angle random walk (ARW) in a low-cost, small-sized package; a resonator having less than a few meters of fiber wound into tight turns with low loss; capability of using a high reflectivity mirror rather than a fiber optic coupler to recirculate light in the ring resonator; a compact, stable external-cavity laser whose external components can be mounted on a silicon optical bench; a MEMS prism embeddable in silicon that efficiently directs light in and out of silicon; minimized non-linear effects in silica fibers that may promote gyro errors; attenuated thermally-driven polarization errors by minimizing the drift (over temperature) of a potential second resonance peak corresponding to a second polarization mode in the optical fiber; substantial reduction of light loss at transition point to optical fiber coil 24; a capability of winding the optical fiber coil into a very tight (e.g., pencil diameter) loops with little to no change in light transmission properties.

In one exemplary embodiment, the RFOG 10 is constructed on a silicon-based micro-optical bench that integrates electronics and optics and provides an efficient, expedient, and mechanically stable interface between the two. Optical functions, such as associated with the wave modulators 16, 18, may be incorporated in waveguides located close to the surface of the optical bench, and miniature optical components having a feature size of as little as 10 microns may be mounted on silicon surfaces to eliminate large bulk optics, even though the light wave may be traveling in free space. Laser diodes and external elements for stabilizing their frequency may also be mounted on the top surface of the silicon optical bench. In this exemplary embodiment, the laser and related frequency tuning components may be mounted on the optical bench, and using the serrodyne method for frequency shifting enables the use of an integrated optical phase modulator in a silicon waveguide for the frequency shifter. A microelectromechanical system (MEMS) optical prism may be used as a highly reflective laser prism capable of directing light into and out of the silicon waveguide. The use of these techniques allows the fabrication of optics in a silicon platform and thus integrated with the electronics.

The RFOG 10 is suited to a variety of applications including, by way of example and not of limitation, applications requiring inertial guidance such as aircraft, land vehicle, submarine, satellite, surface ship navigation, and the like. In addition, the relatively small size envisioned for the RFOG 10 would enable a practical usage on very small platforms including, by way of example and not of limitation, small robots, individual soldier footwear, and small-scale satellites.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A ring resonator for circulating light beams in first and second counter-propagating directions, the ring resonator comprising:
   an optical fiber coil having a hollow core and first and second ends;
   a first partially reflective body configured to:
      receive an input light beam; and
      direct a portion of said input light beam in said first counter-propagating direction of the ring resonator, said portion of said input light beam entering one of said first and second ends; and
   a second partially reflective body configured to:
      direct together with said first partially reflective body a majority of a circulating light beam in said first counter-propagating direction of the ring resonator, said circulating light beam based on said input light beam; and
      derive a transmission mode component of said circulating light beam at one of said first and second ends, said transmission mode component indicating a first resonance peak of said first counter-propagating direction of the ring resonator.

2. A ring resonator according to claim 1, wherein said input light beam comprises first and second input light beams, and wherein said first partially reflective body is further configured to:
   receive said first input light beam; and
   direct a portion of said first input light beam into said hollow core at said first end in said first counter-propagating direction of the ring resonator; and
   wherein said second partially reflective body is further configured to:
      direct a majority of a first circulating light beam from said second end to said first partially reflective body, said first circulating light beam based on said first input light beam; and
      derive a first transmission mode component from said first circulating light beam at said second end, said first transmission mode component indicating a first resonance peak of said first counter-propagating direction of the ring resonator.

3. A ring resonator according to claim 2, wherein said first partially reflective body is further configured to:
   direct a portion of said input light beam to said second partially reflective body in said first counter-propagating direction of the ring resonator; and
   direct a majority of said circulating light beam from said first end to said second partially reflective body; and
   wherein said second partially reflective body is further configured to derive said first transmission mode component from said majority of said circulating light beam.

4. A ring resonator according to claim 1, wherein said second partially reflective body comprises a transmission device configured to derive said transmission mode component, said transmission mode component being derived from a single polarization mode and a single spatial mode of the ring resonator.

5. A ring resonator according to claim 4, wherein said single polarization mode is selected from a substantially S-polarized mode and a substantially P-polarized mode, and wherein said single spatial mode is a lowest order spatial mode.

6. A ring resonator according to claim 1, wherein said input light beam has a frequency and said first counter-propagating direction has a resonance frequency, and wherein said second partially reflective body is further configured to derive said transmission mode component when said frequency of said input light beam is tuned to said resonance frequency.

7. A ring resonator according to claim 2, further comprising a resonance frequency detector configured to:
   receive said first transmission mode component from said second partially reflective body; and
   determine a resonance center from said first transmission mode component, said resonance center indicating a resonance frequency of said first counter-propagating direction.

8. A ring resonator according to claim 2, wherein said first partially reflective body is further configured to receive said second input light beam and direct a portion of said second input light beam at said second partially reflective body; and
   wherein said second partially reflective body is further configured to direct a majority of a second circulating light beam and a majority of said portion of said second input light beam into said hollow core at said second end in said second counter-propagating direction, said second circulating light beam based on said second input light beam, said first partially reflective body further configured to direct a majority of said second circulating light beam from said first end to said second partially reflective body.

9. A ring resonator according to claim 8, wherein said second partially reflective body is further configured to derive a second transmission mode component from said second circulating light beam, said second transmission mode component indicating a resonance peak of said second counter-propagating direction.

10. A ring resonator according to claim 1, wherein said optical fiber coil is configured to minimize guidance of a higher order spatial mode of said circulating light beam.

11. A ring resonator according to claim 1, wherein said optical fiber coil has a predetermined length configured to separate at least one resonance peak of a higher order spatial mode of said circulating light beam from a lowest order spatial mode of said circulating light beam.

12. A ring resonator according to claim 1, wherein said optical fiber coil has a predetermined length configured to separate a second resonance peak from said first resonance peak, said second resonance peak based on a second polarization mode of said circulating light beam.

13. A ring resonator according to claim 1, wherein said first partially reflective body is further configured to direct a reflected beam component away from the ring resonator, said reflected beam component based on a decay component of said circulating light beam and a non-mode matched component of said input light beam.

14. A resonator fiber optic gyro (RFOG) assembly comprising:
  a beam generator configured to produce first and second light beams;
  a ring resonator having an input configured to receive said first and second light beams and having an output, said ring resonator comprising first and second partially reflective mirrors and a hollow core optical fiber configured to circulate first and second circulating light beams in respective first and second counter-propagating directions, said ring resonator configured to:
    derive a first component of said first circulating light beam at said output, said first circulating light beam based on said first light beam, said first component of said first circulating light beam indicating a resonance of said first counter-propagating direction of said ring resonator; and
    derive a second component of said second circulating light beam at said output, said second circulating light beam based on said second light beam, said second component of said second circulating light beam indicating a resonance of said second counter-propagating direction of said ring resonator; and
  a photodetector configured to:
    detect a first resonance center of said first counter-propagating direction based on said first component; and
    detect a second resonance center of said second counter-propagating direction based on said second component.

15. An RFOG according to claim 14, wherein said hollow core optical fiber has first and second ends, and wherein:
  said first partially reflective mirror is configured to direct a portion of said first light beam and a first majority of said first circulating light beam into said hollow core at said first end; and
  said second partially reflective mirror is configured to:
    sample with a low loss said first component from said first circulating light beam; and
    direct a second majority of said first circulating light beam at said first partially reflective mirror.

16. An RFOG according to claim 14, wherein said first partially reflective mirror is farther configured to direct a portion of said second light beam and a first majority of said second circulating light beam at said second partially reflective mirror; and
  wherein said second optical element is further configured to:
    sample with a low loss said second component from said second circulating light beam and said portion of said second light beam; and
    direct a second majority of said second circulating light beam into said hollow core at said second end.

17. An RFOG according to claim 14, wherein said beam generator is configured to generate light beams having spatial distributions matched to a predetermined spatial mode of said ring resonator and having a state of polarization matched to a predetermined polarization mode of said ring resonator.

18. An RFOG according to claim 17, wherein said predetermined spatial mode is a lowest order spatial mode, and wherein said predetermined polarization mode is selected from one of a substantially S-polarized mode and a substantially P-polarized mode.

19. An RFOG according to claim 14 further comprising a processor coupled to said photodetector and said beam generator, said processor configured to:
  determine a first resonance frequency of said first counter-propagating direction based on said first resonance center;
  determine a second resonance frequency of said second counter-propagating direction based on said second resonance center; and
  determine a frequency shift ($\Delta f$) from said second resonance frequency to said first resonance frequency, said $\Delta f$ indicating a rotational rate of the RFOG.

20. A method for sensing a rotation rate of a ring resonator having a hollow core optical fiber, the method comprising the steps of:
  transmitting each of first and second light beams into the hollow core optical fiber in respective first and second counter-propagating directions of the ring resonator, said transmitting comprising impinging the first beam of light onto a first partially reflective mirror and impinging the second beam of light onto a second partially reflective mirror;
  circulating a portion of the first and second light beams through the hollow core optical fiber with the first and second partially reflective mirrors while detecting a transmissive component sampled from each of first and second circulating light beams, each of the transmissive components indicating a resonance peak based on a predetermined spatial order mode and a single polarization mode, the first and second circulating light beams based on the first and second light beams;
  determining a first resonance frequency of a first counter-propagating direction of the ring resonator from the resonance peak of the first counter-propagating direction;
  determining a second resonance frequency of a second counter-propagating direction of the ring resonator from the resonance peak of the second counter-propagating direction;
  measuring a frequency shift between the first resonance frequency and the second resonance frequency, the frequency shift indicating the rotation rate; and
  generating a signal representative of the frequency shift.

* * * * *